Dec. 8, 1970   R. D. McGUNIGLE   3,545,283
NON-LINEAR ACCELEROMETER
Filed July 25, 1966   2 Sheets-Sheet 1
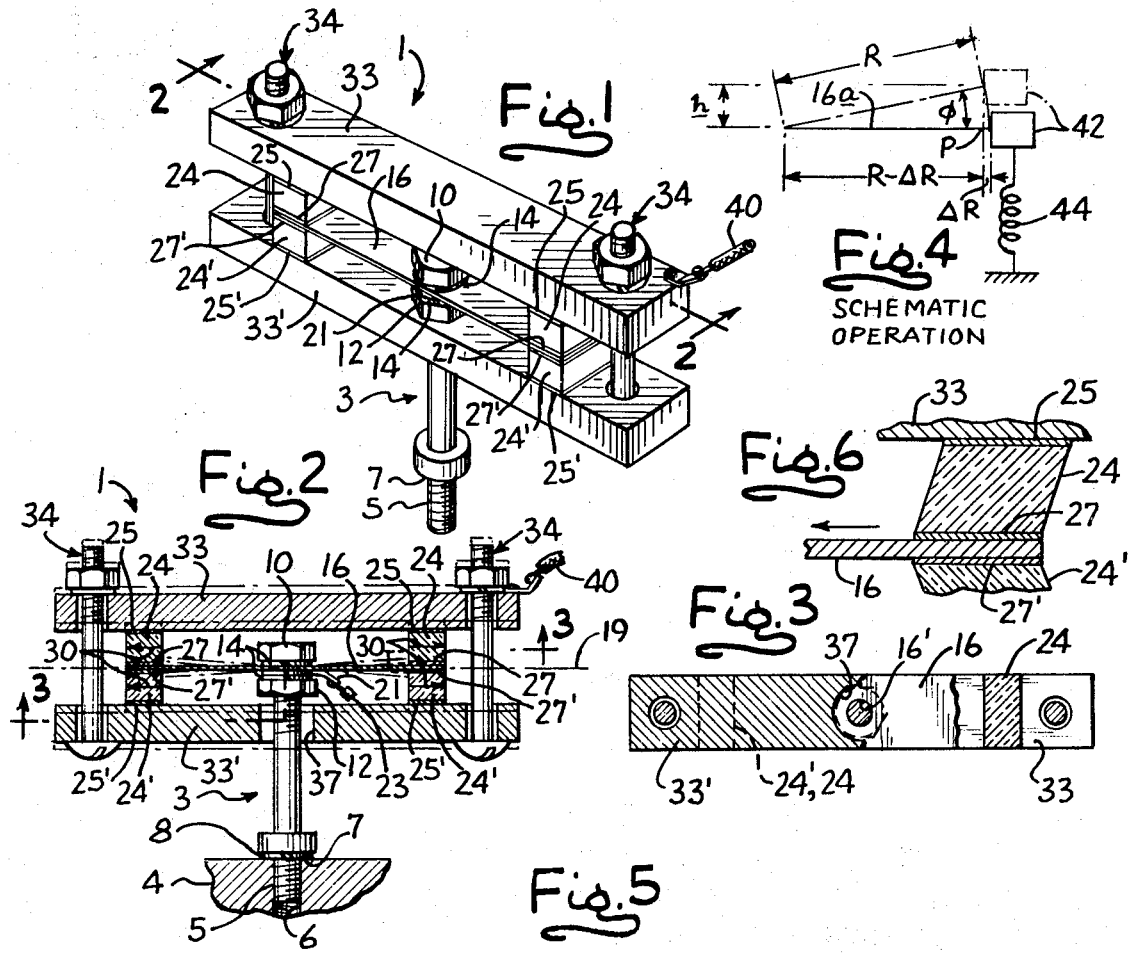
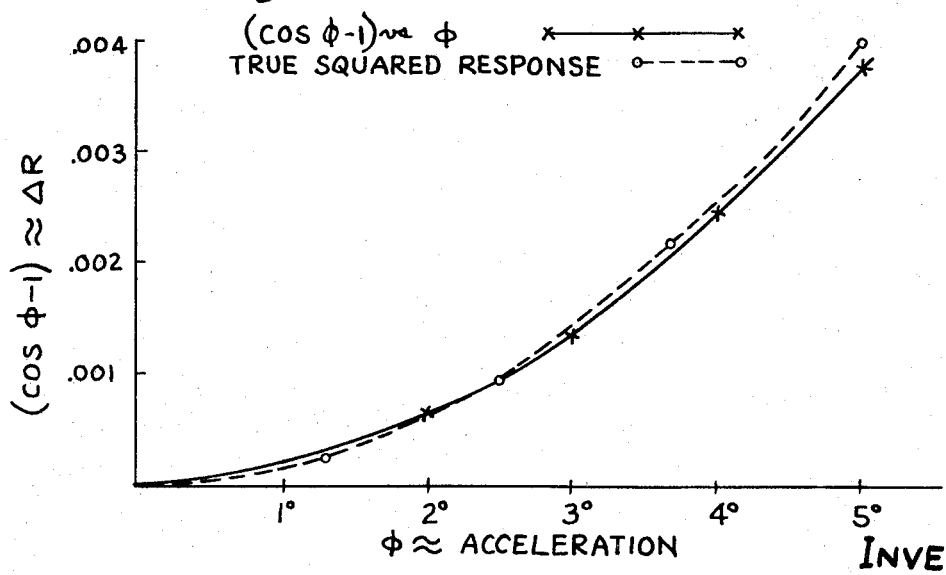
INVENTOR
RICHARD D. McGUNIGLE
by: Wallenstein, Spangenberg, Hattis & Strampel
ATTYS.

United States Patent Office 3,545,283
Patented Dec. 8, 1970

3,545,283
NON-LINEAR ACCELEROMETER
Richard D. McGunigle, Fullerton, Calif., assignor to Electra Scientific Corporation, Fullerton, Calif., a corporation of California
Filed July 25, 1966, Ser. No. 567,695
Int. Cl. G01p 15/08
U.S. Cl. 73—517
10 Claims

ABSTRACT OF THE DISCLOSURE

A non-linear accelerometer unit comprising a resilient arm extending in a reference plane in its unstressed state and anchored at one portion thereof so at least an end portion thereof is free to flex under acceleration forces. A measurement is obtained of the square of the acceleration imparted thereto by means for measuring the change in the distance between the projection of the flexing end portion of the arm on said reference plane and the initial position thereof in its unstressed state as the arm flexes over small angles.

---

This invention relates to accelerometers which provide an output which bears a non-linear relationship to the acceleration imparted thereto.

The most important, but not the only, application of the invention is in omnidirectional accelerometers which provide a signal which is a function of the amplitude of the acceleration involved independently of the direction of the acceleration imparted to the accelerometer. Omnidirectional accelerometers generally comprise three directional accelerometer units, each of which responds to the component of the applied acceleration which falls along a line which may be referred to as the axis of sensitivity thereof. The units are mounted on a common frame so that their axes of sensitivity are mutually perpendicular. Generally, these accelerometer units are devices which provide an electrical output which bears a linear relationship to the acceleration component falling along their axes of sensitivity. To obtain a measurement of the amplitude of the acceleration applied to the accelerometer assembly involved, it has generally been necessary to feed the outputs of the accelerometer units to separate squaring networks which square the output of the individual accelerometer units. The outputs of these networks are then added together to provide a resultant signal proportional to the sum of the squares of the outputs of the individual output elements. The square root of this resultant signal then directly indicates the amplitude of the acceleration involved.

One of the objects of the invention is to provide a relatively simply constructed accelerometer unit which has a non-linear relationship between the signal output thereof and the component of acceleration applied along its axis of sensitivity. A related object of the invention is to provide a non-linear accelerometer units as described where the unit has a low sensitivity at low input levels and a high sensitivity at high input levels to provide an accelerometer with a wide effective dynamic range and a limited electrical dynamic range. Such an accelerometer unit, for example, has a special utility in impact fuses where it is desirable to have the unit non-responsive to low amplitude spurious accelerations, as during loading or handling, and high sensitivity to impact.

Another object of the invention is to provide a non-linear accelerometer as described which provides directly an electrical output which is proportional approximately to the square of the acceleration along its axis of sensitivity. In the latter case, by relating the axes of sensitivity of three identical accelerometer units so they fall along mutually orthogonal axis and connecting the outputs of such accelerometers units in series, a resultant signal is directly obtained without the use of squaring networks which signal is a function of the amplitude of the acceleration applied in any direction to the support structure carrying the accelerometer units.

The various forms of the present invention utilize at least one resilient arm having one portion anchored in place to a support member attached to the test body and another portion attached to a seismic mass which effects vibration or deflection thereof under the acceleration conditions in a direction generally transverse to the plane of the resilient arm. The deflected portion makes an angle with the initial or reference plane of the resilient arm. The amplitude of the arm deflection increases with the magnitude of the applied acceleration, and the position of the projection of a point on the deflecting portion of the resilient arm on the aforesaid reference plane bears a non-linear relation to the acceleration imparted to the resilient arm along a line transverse to the reference plane, which is the axis of sensitivity of the accelerometer unit. The accelerometer unit includes a means for providing a signal which indicates the variation of the position of the aforesaid projected point on the reference plane. In the preferred form of the invention, this means is one or more bodies of piezoelectric material related to the resilient arm so that the stresses applied to the piezoelectric material and the voltage generated thereby vary with the position of the aforesaid projected point on the reference plane.

In the most advantageous form of the invention, the resilient arm is clamped at its mid-point to the head portion of a mounting bolt which attaches the accelerometer unit to a support base to which the acceleration to be measured is imparted. In such case, both outer end portions of the resilient arm may flex on either side of the initial or reference plane of the arm in a direction generally transverse to the axis of the mounting bolt. Each outer end portion of the resilient arm is preferably sandwiched between a pair of piezoelectric members which are in turn, clamped between a pair of rigid outer clamping members. The piezoelectric and clamping members form a seismic mass which vibrates with the resilient arm in the example of the invention being described. The resilient arm should be longitudinally inelastic relative to the piezoelectric members so that, as the end portions of the resilient arm deflect, the length of the arm remains substantially constant because of the much greater elasticity of the piezoelectric members, and the faces of the piezoelectric members confronting the resilient arm will be pulled in a direction parallel to the resilient arm and the faces of the piezoelectric members confronting the clamping members, to create shear stresses in the piezoelectric members. These stresses will result in the generation of a voltage in each piezoelectric member which bears a non-linear relationship to the acceleration component directed parallel to the direction of the deflection of the resilient arm. If the resilient arm and the clamping members are made of conductive material, they can act as conductors for coupling the voltage generated thereby to an external circuit. In such case, the faces of the piezoelectric members confronting the resilient arm and the clamping members are electroded, and the piezoelectric members are identically polarized in directions parallel to the electroded faces so the shear stresses generate voltages across the electroded faces of the piezoelectric members. The resilient arm and clamping members thus act as conductors of the generated voltage and, the outputs of the piezoelectric members are effectively connected in parallel.

As previously indicated, one specific aspect of the invention is the provision of an accelerometer unit which directly provides an output proportional to the square of the acceleration. In the exemplary accelerometer being described, this is accomplished by utilizing the linear spring mass system (comprising, in the preferred form of the invention, the resilient arm, piezoelectric members and clamping members) and by adjusting the stiffness of the resilient arm of the unit so that it deflects only a very small angle for the maximum acceleration to be measured.

The above, and other objects, features and advantages of the invention will become apparent upon making reference to the specification to follow, the claims and the drawings wherein:

FIG. 1 is a perspective view of an accelerometer unit constituting the preferred form of the present invention;

FIG. 2 is a longitudinal sectional view of the accelerometer unit of FIG. 1, taken substantially along the line 2—2;

FIG. 3 is a sectional view through the accelerometer unit, taken substantially along the line 3—3 in FIG. 2;

FIG. 4 is a simplified diagram of the spring mass system of the accelerator unit of FIG. 3, the diagram illustrating the principle of operation of the invention;

FIG. 5 shows a solid line curve illustrating the variation of one of the variables of the spring mass system of FIG. 4 as a function of the angle of deflection of the spring mass system and shows in dashed lines an ideal curve which varies with the square of the acceleration;

FIG. 6 is an enlarged fragmentary section of the piezoelectric members showing in exaggerated form the deformation of the piezoelectric members forming part of the accelerometer unit of FIGS. 1-3 when subjected to acceleration forces;

Figure 7:
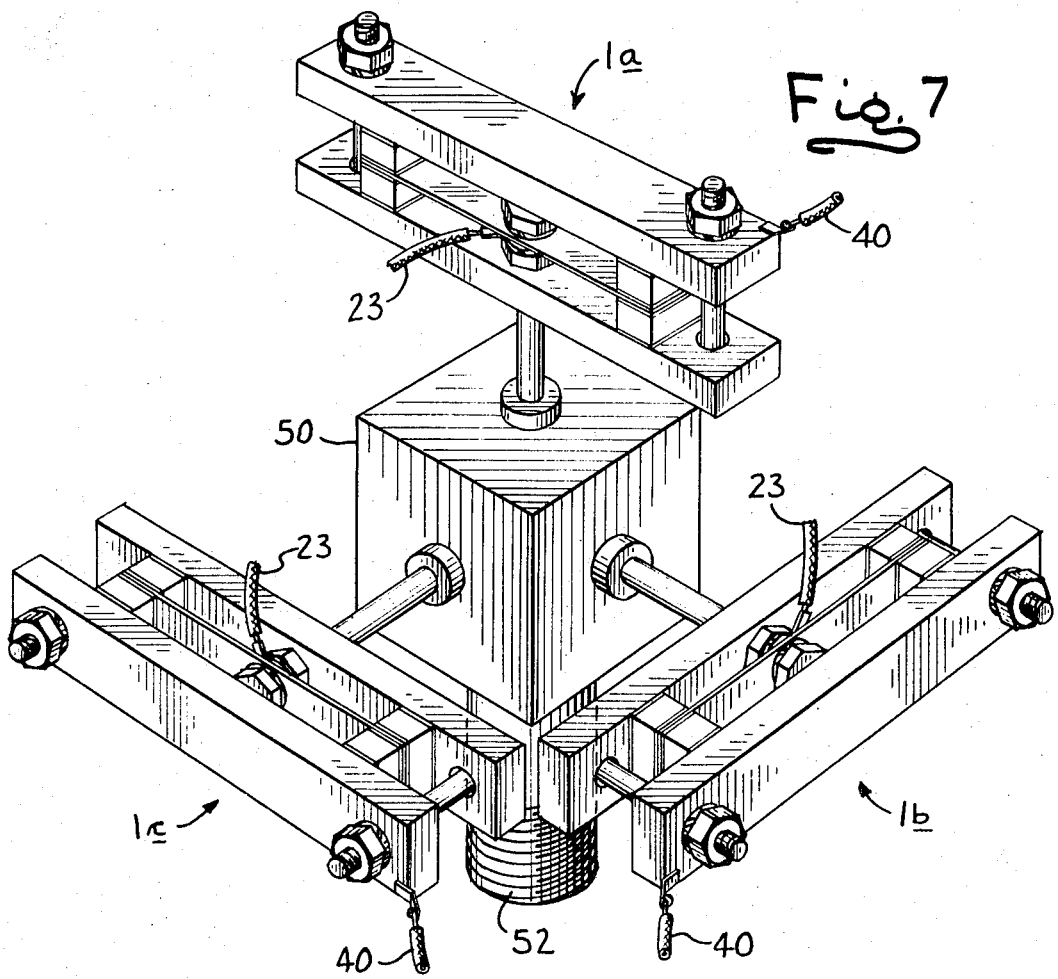
FIG. 7 is a perspective view of an omnidirectional accelerometer system utilizing three of the accelerometer units shown in FIGS. 1-3.

Referring now more particularly to FIGS. 1-3, there is illustrated an accelerometer unit 1 constituting a preferred form of the invention where the unit has a rectangular configuration. It should be understood, however, that the present invention is applicable to other configurations and constructions such as one having circular or annular configuration. The accelerometer unit 1 includes means, such as an anchoring bolt 3, for anchoring the unit to a support member or test body 4 subjected to the acceleration to be measured. The anchoring bolt has a threaded shank portion 5 adapted to thread into a threaded socket 6 formed in the support member or test body. The bolt has a shoulder 7 which rests upon the support member or test body and a lock washer 8 may be sandwiched between the support member or test body and the shoulder 7 to mount the unit securely in place.

Sandwiched between the head 10 of the bolt 3 and a nut 12 threaded on the bolt shank 5 is an assembly including one or more lock washers 14 and the center portion of a resilient arm 16. The resilient arm 16 is illustrated as having an elongated rectangular shape with a hole 16' which snugly fits around the shank of the anchoring bolt. When the accelerometer unit is at rest, the resilient arm 16 extends in a reference plane 19 extending transversely to the axis of the anchoring bolt, and the opposite ends thereof are free to flex above and below the aforementioned reference plane. The assembly sandwiched between the bolt head 10 and the nut 12 may also include an apertured terminal strip 21 which is secured to a conductor 23 which connects the accelerometer to an external voltage measuring circuit. For reasons to be explained, the resilient arm 16 should be made of material, such as stainless steel, which is relatively inelastic in tension, so that the length of the resilient arm remains substantially constant under the operating conditions of the accelerometer unit.

In the preferred form of the invention being described, each of the end portions of the resilient arm 16 are sandwiched between a pair of electroded piezoelectric bars 24–24'. For reasons to be explained, the piezoelectric bars should be complaint or elastic relative to the resilient arm 16. Each of the piezoelectric bars which may be made of a piezoelectric ceramic material, such as barium titanate or the like, is preferably electroded on the longitudinally facing surfaces thereof (the upper and lower faces as viewed in FIG. 2), the electrodes being indicated by reference numerals 25–27 and 25'–27'. The piezoelectric bars are indicated as being polarized in a direction transverse to the electroded faces thereof, a horizontal direction as viewed in FIG. 2, as indicated by the arrows 30. The spring arm 16 makes electrical contact with the innermost electrodes 27–27' so that the voltage appearing at the electrodes 27–27' will be coupled to the external circuit through the conductor 23.

The piezoelectric bars 24–24' are tightly clamped between a pair of rectangular clamping members 33–33' which have a substantial stiffness relative to the resilient arm 16. For example, the clamping members may be made of aluminum and have a thickness relative to that of the resilient arm comparable to that illustrated in the drawings. Clamping bolt and nut assemblies 34—34 extend between the ends of the clamping members 33–33' to apply an appreciable clamping pressure. The shank 5 of the anchoring bolt 3 passes freely through a relatively large central opening 37 in the bottom or innermost clamping member 33', so that the clamping members together with the piezoelectric bars and resilient arm 16 form a spring mass system which can freely flex up and down relative to the reference plane 19 when the accelerometer unit is subjected to acceleration forces. The clamping members 33–33' make direct electrical contact with the outer electrodes 25–25' of the piezoelectric bars 24–24', and the clamping bolt and nut assemblies 34 electrically connect the clamping members 33–33' together.

A conductor 40 is soldered or otherwise electrically connected to one of the clamping members 33, the uppermost member shown in the drawings, and the conductor 40 thereby couples the voltage appearing on the outermost electrodes 25–25' of the piezoelectric bars 24–24' to an external circuit. The accelerometer construction described places the electrodes of the piezoelectric bars 24–24' in parallel electrical relationship. In this environment, each of the piezoelectric bars should be polarized in the same direction, such as outwardly or inwardly. To this end, when the piezoelectric bars are initially fabricated, they are electroded only on their inner and outer faces (their vertical faces as viewed in FIG. 2) and a direct current polarizing voltage source is applied across these electroded faces in the same sense. Thus, for example, in the case of the left hand piezoelectric bars 24–24' viewed in FIG. 2, the left vertical electroded faces of these bars are connected to the positive (or negative) terminal of the voltage source and the right vertical electroded faces of these bars are connected to the negative (or positive) terminal of the voltage source. In the case of the right hand piezoelectric bars, the right hand vertical faces of these bars would be connected to the positive (or negative) terminal of the voltage source and the left hand vertical faces of these bars would be connected to the negative (or postive) terminal of the voltage source. The electroded vertical faces of these bars are then ground away or otherwise removed after the polarization operation and the electrodes 25–25' and 27–27' may then be applied thereto.

As prveiously indicated, the preferred form of the invention provides a voltage across the output conductors 23 and 40 which is preferably a function of the square of the acceleration component applied along the axis of the anchoring bolt 3. (The broadest aspect of the invention, however, requires only some non-linear relationship between the output of the accelerometer unit and the acceleration component, such non-linear relationship preferably being one wherein the change in output for a given change in acceleration is relatively small for low acceleration levels and relatively high for high acceleration levels.)

The principle of operation of the acceleration unit shown in FIGS. 1–3 can be best illustrated by referring to the diagram of FIG. 4. In FIG. 4, the box 42 and the coil 44 together represent a spring mass system subjected to acceleration in the vertical direction. The horizontal line 16a represents one half of the spring arm 16, the left hand end of the line 16a representing the center portion of the spring arm 16 which is immovably anchored between the bolt head 10 and the nut 12, and the right hand end of the line 16a representing the right hand end of the resilient arm 16. (It can be appreciated that a mirror image of the diagram of FIG. 4 can be drawn which represents the left half of the resilient arm 16.) When the accelerometer unit is subjected to acceleration, the component of this acceleration in a direction transverse to the reference plane 19 causes the resilient arm 16 to flex relative to reference plane 19, to form an angle $\phi$ therewith. The flexed arm forms the hypotenuse of a right triangle. The projection of the right hand end of the flexed arm 16 upon the reference plane 19 is identified by reference character P, and the line between point P and the stationary portion of the resilient arm 16 forms the base of the right triangle. The length of the base of this triangle is given by the following equation:

(1) $$L = R - \Delta R$$

where R is the half length of resilient arm 16, and $\Delta R$ is the distance of point P from the right hand end of the line 16a. The relationship between the angle $\phi$ and the base of the right triangle is as follows:

(2) $$\text{cosine } \phi = \frac{R - \Delta R}{R}$$

so (3) $$\Delta R = R(\text{cosine } \phi - 1)$$

Also, (4) $$\text{sine } \phi = \frac{h}{R}$$

where $h$ is the distance of the deflection of the resilient arm 16 measured parallel to the axis of the anchoring bolt 3, namely the altitude of the right triangle. Thus, for small deflection angles where the sine $\phi$ is about equal to $\phi$ in radians:

(5) $$\phi = \frac{h}{R}$$

so that $\phi$ is proportional to the deflection $h$ of the resilient arm. In a linear spring mass system, the deflection $h$ of the resilient arm is proportional to acceleration, so that $\phi$ represents acceleration at small deflection angles.

The solid line curve of FIG. 5 represents the graph of the variable $\Delta R$ (which, according to equation 3 is proportional to the function cosine $\phi - 1$) as a function of $\phi$ or acceleration for an accelerometer like that shown in FIGS. 1–3. The dashed line curve of FIG. 5 represents a true squared response. It can be shown that for relatively small angles, such as up to 3 degrees in FIG. 5, the variable $\Delta R$ falls very close to the curve representing the square of the acceleration.

The variable $\Delta R$ (or cos $\phi - 1$) is most advantageously obtained by the use of piezoelectric members arranged, for example, in the maner described above. The deflection of the resilient arm 16 places a strain upon the resilient arm 16 which exerts an inward pull on the faces of the piezoelectric members 24–24' confronting the resilient arm which, however, does not result in any elongation of the resilient arm. It does not cause an inward shifting of the more elastic piezoelectric bars 24–24' which moves the innermost faces of these bars with respect to the outer faces of the same held securely by the stiff clamping members 33–33', as illustrated in FIG. 6. Due to the direction of polarization of the piezoelectric bars, the shear stress applied to the piezoelectric bars will generate a voltage of a given polarity between the inner and outer electrodes of the piezoelectric bars. It has been discovered that the aforesaid shear stresses applied to the piezoelectric bars results in voltages which give a close approximation to the R or cosine $\phi - 1$ variable referred to above.

Figure 8:
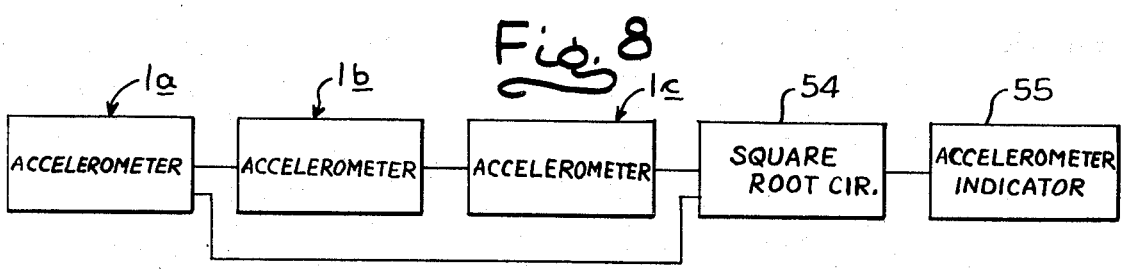
FIG. 8 is an electrical block diagram illustrating the connection of the omnidirectional accelerometer system of FIG. 7 into an external acceleration indicating circuit.

As previously explained, when the output of the accelerometer unit is a square function, the accelerometer unit 1 becomes exceedingly useful in an omnidirectional accelerometer system, as illustrated in FIGS. 7 and 8. As thereshown, three accelerometer units 1a, 1b, and 1c identical to the unit 1 shown in FIGS. 1–3 are mounted on three different faces of a cube-shaped support member 50. The cube-shaped support member 50 has a threaded neck 52 for mounting the entire assembly into a test body subjected to the accelerations being measured. As indicated by FIG. 8, the conductors 23 and 40 of the various accelerometer units are connected so that the outputs of the accelerometers are in series circuit relation, to provide a resultant voltage which is the sum of the squares of the outputs of the three accelerometer units 1a, 1b and 1c. The resultant voltage, which is a measure of the square of the amplitude of the acceleration applied to the test body applied in any direction, may be fed to a suitable square root circuit 54 which provides a direct measurement of the amplitude of the acceleration involved. The square root circuit 54 may be coupled to a suitable acceleration indicator unit 55.

As previously indicated, it should be understood that many variations may be made in the preferred form of the invention shown in FIGS. 1 through 3 and 7 without deviating from the broader aspects of the invention.

I claim:

1. A non-linear accelerometer unit comprising: a support member, resilient arm means extending in a reference plane in its unstressed state and having a first portion anchored with respect to the support member and a second portion spaced from said first portion and supported for flexure relative to said first portion of the arm means in a direction extending generally transversely of said reference plane when said support member is accelerated, said resilient arm means having sufficient stiffness that it will flex under the range of accelerations to be measured thereby over a range of very small angles relative to said reference plane where the sine of said angles is approximately equal to the angles in radians, the projection of a point on said second portion of said resilient arm means on said reference plane varying in position on the plane in a manner bearing a non-linear relationship to the amplitude of the flexure of the arm means, and means for measuring the change in the distance between the projection of said point on the reference plane and the initial position of the end of said resilient arm means in its unstressed state over said range of small angles to provide a measurement of the square of the acceleration.

2. The non-linear accelerometer unit of claim 1 wherein the last mentioned means includes piezoelectric means connected to said resilient arm means, means cooperating with the resilient arm means for providing shear stresses in said piezoelectric means in a direction along the length of the arm means as a non-linear function of the flexure of said resilent arm means, the piezoelectric means generating a voltage proportional to the stresses therein, and conduction means electrically connected to said piezoelectric means for coupling said voltage to an external circuit.

3. The accelerometer unit of claim 2 wherein said last mentioned means includes a pair of clamping members between which the resilient arm means and piezoelectric means are clamped in superimposed relation, the resilient arm means being longitudinally inelastic relative to the piezoelectric means wherein flexure of the resilient arm means due to the acceleration of the unit effects the longitudinal shifting of the inner portion of the piezoelectric means confronting the resilient arm means relative to the opposite outer portion thereof adjacent the clamping members.

4. The accelerometer unit of claim 3 wherein said piezoelectric means is polarized in the direction of said shifting of the piezoelectric means, said piezoelectric means having electrodes on the faces thereof confronting the resilient arm means and the clamping members, and said relisient arm means and clamping members constituting electrical conductors electrically interconnecting said terminal means to the electroded faces of said piezoelectric means.

5. The accelerator unit of claim 3 wherein the center portion of said resilient arm means is anchored to said support member so the opposite end portions of said arm means is flexible relative to the center portion of the arm means, and the piezoelectric means being superimposed on both end portions of said arm means and clamped by said clamping members between the clamping members and the resilient arm means, said piezoelectric means and the clamping members forming a seismic mass for the resilient arm means.

6. The accelerator unit of claim 3 wherein said piezoelectric means comprises bodies of such material on opposite faces of said resilient arm means so the arm means is sandwiched therebetween.

7. The accelerator unit of claim 3 wherein said piezoelectric means comprises bodies of such material on opposite faces of said resilient arm means so the arm means is sandwiched therebetween, and said clamping members are electrically connected together so the outputs of said bodies of piezoeletcric means are connected in parallel.

8. The non-linear accelerometer of claim 1 wherein the resilient arm means and the elements flexing with the same forms a substantially linear spring mass system, and the deflection angle subtended between the deflected resilient arm means and the initial plane thereof for the maximum acceleration to be measured being so small that the sine of the deflection angle is approximately equal to the magnitude of the angle in radians, the amplitude of the deflection of the resilient arm means thereby being proportional to said angle and to the component of the applied acceleration parallel to the direction of flexure of the resilient arm means, whereby the distance between the projection of the point of maximum deflection of the resilient arm means on said initial plane and the initial position thereof in an unstressed state is proportion to the cosine of the deflection angle minus one.

9. The accelerator unit of claim 8 wherein the resilient arm means is sufficiently stiff that the maximum angle of deflection thereof for the maximum acceleration to be measured is only a very small angle wherein the curve representing the cosine of the deflection angles minus one approximate a curve proportional to the square of the acceleration involved.

10. The non-linear accelerator of claim 9 in combination with two additional substantially identical accelerometer units, support means for supporting the members of three accelerometer units in three mutually perpendicular directions so the directions of flexure of the resilient arm means of the accelerometer units fall along three mutually orthogonal lines, and means electrically connecting the outputs of the piezoelectric means of the accelometer units in mutual series circuit relationship to provide a resulting output which is the sum of the outputs of the three accelerometer units, such resultant output being a measure of the square of the acceleration applied to said support means independently of the direction of the acceleration.

References Cited
UNITED STATES PATENTS

| | | | |
|---|---|---|---|
| 2,671,178 | 3/1954 | Tomcik | 310—8.5 |
| 2,722,614 | 11/1955 | Fryklund | 310—8.6 |
| 3,113,223 | 12/1963 | Smith | 310—8.5 |
| 3,120,622 | 2/1964 | Dranetz | 310—8.4 |

JAMES J. GILL, Primary Examiner

H. GOLDSTEIN, Assistant Examiner

U.S. Cl. X.R.

310—8.4, 8.5